United States Patent
Kawashima

(10) Patent No.: US 10,048,655 B2
(45) Date of Patent: Aug. 14, 2018

(54) CONTROL DEVICE OUTPUTTING A CONTROL INPUT TO A SYSTEM BASED ON AN OBSERVABLE AMOUNT OBTAINED FROM THE SYSTEM

(71) Applicant: DAIKIN INDUSTRIES, LTD., Osaka-shi, Osaka (JP)

(72) Inventor: Reiji Kawashima, Kusatsu (JP)

(73) Assignee: DAIKIN INDUSTRIES, LTD., Osaka-Shi, Osaka (JP)

( * ) Notice: Subject to any disclaimer, the term of this patent is extended or adjusted under 35 U.S.C. 154(b) by 295 days.

(21) Appl. No.: 14/784,377

(22) PCT Filed: Mar. 13, 2014

(86) PCT No.: PCT/JP2014/056676
§ 371 (c)(1),
(2) Date: Oct. 14, 2015

(87) PCT Pub. No.: WO2014/171233
PCT Pub. Date: Oct. 23, 2014

(65) Prior Publication Data
US 2016/0070241 A1     Mar. 10, 2016

(30) Foreign Application Priority Data

Apr. 15, 2013   (JP) ................. 2013-084558

(51) Int. Cl.
*G05B 11/42*   (2006.01)
*H02M 7/48*    (2007.01)
(Continued)

(52) U.S. Cl.
CPC ............... *G05B 11/42* (2013.01); *H02J 3/01* (2013.01); *H02J 3/18* (2013.01); *H02M 7/48* (2013.01);
(Continued)

(58) Field of Classification Search
CPC ... G05B 11/42; H02J 3/01; H02J 3/18; H02M 2001/4283; H02M 7/48; H02P 27/04; Y02B 70/126; Y02E 40/30; Y02E 40/40
See application file for complete search history.

(56) References Cited

U.S. PATENT DOCUMENTS 5,063,532 A     11/1991   Takeda et al.
5,818,178 A *   10/1998   Marumoto ............ H02P 7/0094
                                                  318/400.32
(Continued)

FOREIGN PATENT DOCUMENTS

| JP | 1-227630 A | 9/1989 |
| JP | 2001-186752 A | 7/2001 |
| JP | 2011-109805 A | 6/2011 |

*Primary Examiner* — Kenneth M Lo
*Assistant Examiner* — Chad Erdman
(74) *Attorney, Agent, or Firm* — Birch, Stewart, Kolasch & Birch, LLP

(57) ABSTRACT

A control device outputs, to a to-be-controlled system which operates based on a control input and from which an observable amount varying cyclically is obtained, the control input based on the observable amount. The control device includes a deviation processing unit performing at least proportional integral control on a deviation between the observable amount and a command value being a target value of the observable amount and varying cyclically, and a totaling unit totaling an output of the deviation processing unit for each cycle of the command value to generate the control input.

12 Claims, 18 Drawing Sheets

(51) Int. Cl.
*H02J 3/01* (2006.01)
*H02J 3/18* (2006.01)
H02P 27/04 (2016.01)
H02M 1/42 (2007.01)

(52) U.S. Cl.
CPC ..... *H02M 2001/4283* (2013.01); *H02P 27/04* (2013.01); *Y02B 70/126* (2013.01); *Y02E 40/30* (2013.01); *Y02E 40/40* (2013.01)

(56) References Cited

U.S. PATENT DOCUMENTS

| | | | |
|---|---|---|---|
| 8,797,199 B1* | 8/2014 | Goodnow | G05B 19/042 341/142 |
| 2003/0052641 A1* | 3/2003 | Yoshimoto | H02P 6/10 318/700 |
| 2005/0207899 A1* | 9/2005 | Furuta | F01P 7/048 417/32 |
| 2011/0248652 A1* | 10/2011 | Sumioka | H02N 2/142 318/116 |
| 2012/0026849 A1* | 2/2012 | Sasai | G11B 7/0908 369/44.32 |
| 2013/0106336 A1* | 5/2013 | Sonoda | G05B 19/404 318/624 |
| 2015/0091483 A1* | 4/2015 | Osamura | H02P 21/141 318/400.25 |
| 2015/0280631 A1* | 10/2015 | Osamura | H02P 23/14 318/461 |
| 2015/0372606 A1* | 12/2015 | Tamura | H02M 3/33584 363/21.04 |

* cited by examiner

CONTROL DEVICE OUTPUTTING A CONTROL INPUT TO A SYSTEM BASED ON AN OBSERVABLE AMOUNT OBTAINED FROM THE SYSTEM

TECHNICAL FIELD

The present disclosure relates to technology of outputting, to a system to be controlled (hereinafter, referred to as a "to-be-controlled system") which operates based on a control input and from which an observable amount varying cyclically is obtained, the control input based on the observable amount.

BACKGROUND ART

When a load current flows from an AC power supply to a load, so-called harmonic components are typically generated in the load current. Reducing the harmonic components, which cause so-called harmonic interference, is a well-known subject.

As an approach of meeting the subject, an active filter is proposed. The active filter operates so as to prevent the harmonic components of the load current from flowing into the AC power supply.

For example, a parallel active filter is connected to the AC power supply through an interconnection reactor. Passing a compensating current from the parallel active filter reduces the harmonic components of a power current flowing through the AC power supply.

For the parallel active filter to function as described above, a control input for controlling the parallel active filter is required.

The parallel active filter is connected to the AC power supply together with the load as described above. Thus, the parallel active filter including the interconnection reactor and the load are considered collectively to be a to-be-controlled system.

The parallel active filter operates based on a control input, and accordingly, the to-be-controlled system is also considered to operate based on the control input.

The compensating current varies in accordance with the power phase of the AC power supply. In the to-be-controlled system, an observable amount varying cyclically, namely, a compensating current is accordingly obtained.

The control input is determined based on a deviation between a command value and a detection value (hereinafter referred to as a "compensating current command value" and a "compensating current detection value," respectively) of the compensating current.

Therefore, the to-be-controlled system can be generalized and considered as follows: it operates based on a control input determined based on an observable amount varying cyclically.

As described above, the control input of the parallel active filter is based on a deviation between the compensating current command value and the compensating current detection value. More specifically, a control input is determined as a sum of a constant multiple of an integrated value of a deviation and a constant multiple obtained as a result of the accumulation of a deviation in accordance with the power phase.

SUMMARY OF INVENTION

Problem to be Solved by the Invention

Unfortunately, the thus obtained control input has an insufficient effect of canceling out a higher harmonic components.

The present disclosure therefore has an object to cause, if variations in the target value ("compensating current command value" in the example above) of an observable amount ("compensating current" in the example above) become cyclically abrupt, the control input and eventually the observable amount to follow the cyclically abrupt change with high responsiveness.

Means to Solve the Problem

The present disclosure is a control device (7) outputting, to a to-be-controlled system (2, 4, 6, 8) which operates based on a control input (Vid, Viq) and from which an observable amount (id, iq) varying cyclically is obtained, the control input based on the observable amount.

A first aspect of the present disclosure includes a deviation processing unit (714, 715) performing at least proportional integral control on a deviation between the observable amount and a command value (id*, iq*) being a target value of the observable amount and varying cyclically, and a totaling unit (716, 717, 718, 719) totaling an output (ido, iqo) of the deviation processing unit for each cycle of the command value to generate the control input.

In a second aspect of the control device according to the present disclosure, in the first aspect, the deviation processing unit (714, 715) includes a proportional computing unit (714p, 715p) outputting a result (idp, iqp) obtained by multiplying the deviation between the command value (id*, iq*) and the observable amount (id, iq) by a first gain (Kpd, Kpq), an integral computing unit (714i, 715i) outputting a value (idi, iqi) obtained by multiplying an integral of the deviation by a second gain (Kid, Kiq), and a first adder (714s, 715s) adding and outputting at least an output of the proportional computing unit and an output of the integral computing unit.

The totaling unit includes a repetitive controller (716, 717) accumulating an output of the first adder for each cycle of the command value to output a result (idr1, iqr1) obtained by multiplying a result of the accumulation by a third gain (Krd, Krq), and a second adder (718, 719) adding an output of the first adder and an output of the repetitive controller to output the control input (Vid, Viq).

In a third aspect of the control device according to the present disclosure, in the second aspect, the integral computing unit (714i, 715i) operates after a lapse of a predetermined time from startup of the to-be-controlled system (2, 4, 6, 8).

In a fourth aspect of the control device according to the present disclosure, in the second or third aspect, the deviation processing unit (714, 715) further includes a differential computing unit (714d, 715d) differentiating the deviation and outputting a result (idd, iqd) obtained by multiplying a result of the differentiation by a fourth gain (Kdd, Kdq).

The first adder (714s, 715s) adds and outputs an output (idp, iqp) of the proportional computing unit (714p, 715p), an output (idi, iqi) of the integral computing unit (714i, 715i), and an output of the differential computing unit.

In a fifth aspect of the control device according to the present disclosure, in any one of the second to fourth aspects, the repetitive controller (716, 717) includes a delay unit (716b, 717b) outputting an input value with a delay by the cycle, a third adder (716s, 717s) obtaining a sum of an output of the first adder (714s, 715s) and an output of the delay unit and inputting the sum to the delay unit, and a multiplier (716c, 717c) performing a multiplication by the third gain (Krd, Krq) to obtain an output of the repetitive controller.

In a sixth aspect of the control device according to the present disclosure, in the fifth aspect, the third adder (716s, 717s) adds an output of the delay unit (716b, 717b), on which low-pass transmission has been performed, and an output of the first adder (714s, 715s).

In a seventh aspect of the control device according to the present disclosure, in any one of the second to sixth aspects, the second adder (718, 719) adds an output (idr1, iqr1) of the repetitive controller (716, 717) in a first phase of the cycle and an output (ido, iqo) of the first adder (714s, 715s) in a second phase of the cycle to output the control input (Vid, Viq). The first phase and the second phase differ from each other.

Effects of the Invention

According to the first aspect of the control device of the present disclosure, if variations in the command value become cyclically abrupt, the control input and eventually the observable amount follow the cyclically abrupt change with high responsiveness.

According to the second aspect of the control device of the present disclosure, not only a result is obtained by integrating the deviation in accordance with a control timing, but also the result is further integrated for each cycle of the command value by the repetitive controller. This allows, if variations in the command value become cyclically abrupt, the control input and eventually the observable amount to follow the cyclically abrupt change with high responsiveness.

According to the third aspect of the control device of the present disclosure, the harmonic components of a power current immediately after startup is reduced.

According to the fourth aspect of the control device of the present disclosure, the stability in the to-be-controlled system is enhanced.

The fifth aspect of the control device according to the present disclosure contributes to the configuration of the second aspect.

According to the sixth aspect of the control device of the present disclosure, the stability in the to-be-controlled system is enhanced.

According to the seventh aspect of the control device of the present disclosure, if variations in the command value become cyclically abrupt, the first phase and the second phase can be selected such that the control input and eventually the observable amount follow the cyclically abrupt change with high responsiveness.

These and other objects, features, aspects and advantages of the present disclosure will become more apparent from the following detailed description of the present disclosure when taken in conjunction with the accompanying drawings.

DESCRIPTION OF EMBODIMENTS

Description is given below by taking a configuration, including a load through which a load current from an AC power supply flows and a parallel active filter, as an example of a to-be-controlled system which operates based on a control input and from which an observable amount varying cyclically is obtained. The to-be-controlled system, however, needs not to be limited to this example.

Figure 1:
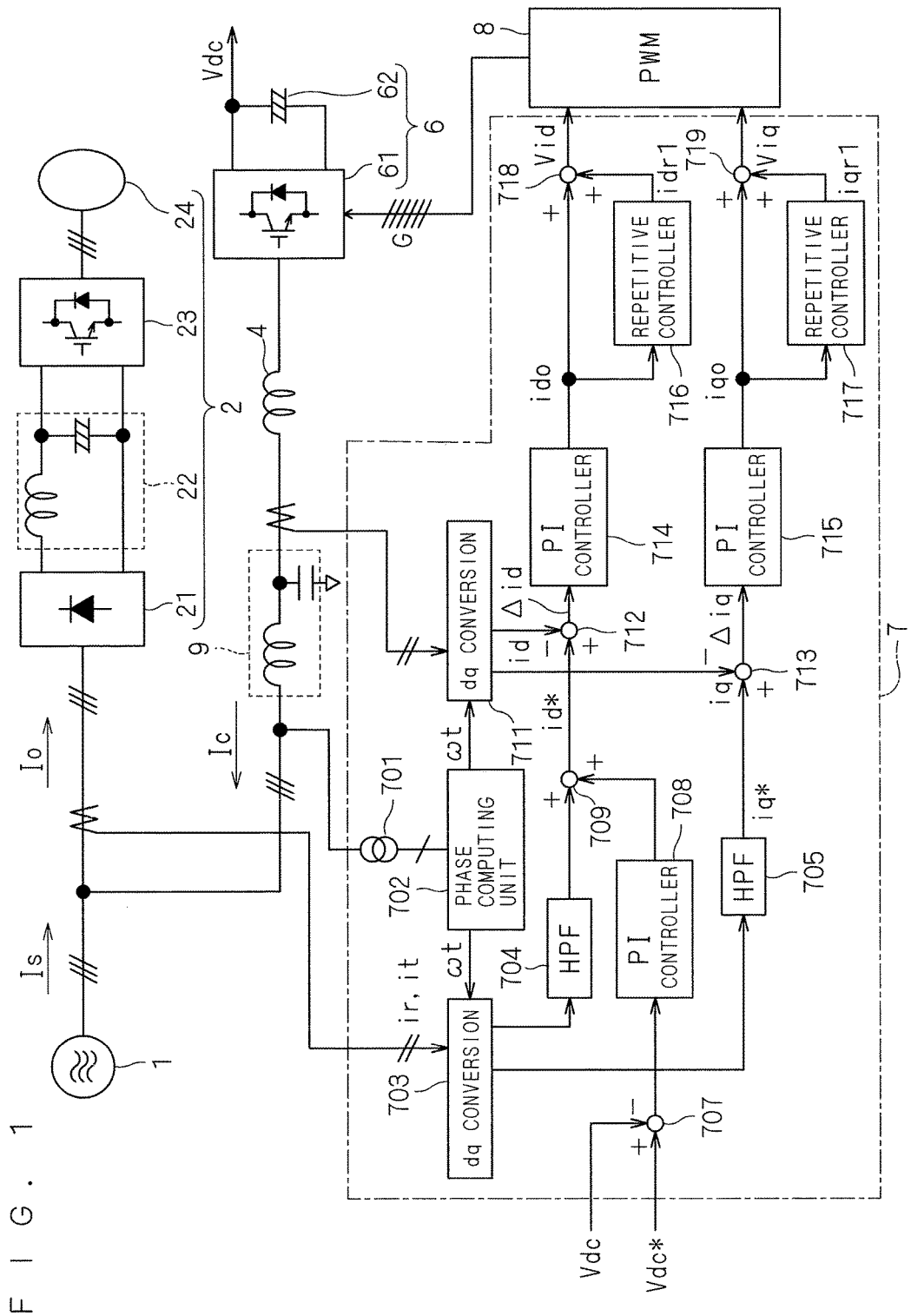
FIG. 1 is a block diagram showing an example embodiment for carrying out the present disclosure.

FIG. 1 is a block diagram showing an example embodiment for carrying out the present disclosure. A three-phase AC power supply 1 supplies a three-phase load current Io to a load 2. A parallel active filter 6 is connected to the AC power supply 1 through a three-phase interconnection reactor 4. The parallel active filter 6 outputs a three-phase compensating current Ic.

Herein, description is given on the assumption that a direction in which the compensating current Ic flows from the parallel active filter 6 toward the AC power supply 1 is taken as a positive direction and that the sum of a power current Is flowing from the AC power supply 1 and a compensating current Ic is a load current Io.

If the direction of the compensating current Ic is taken as a direction opposite to the direction described in this embodiment, of course, the polarity signs (positive or minus) of the compensating current Ic merely change.

The parallel active filter 6 includes, for example, an inverter 61 and a capacitor 62. The inverter 61 inputs and outputs the compensating current Ic, thereby charging and discharging the capacitor 62 at a DC voltage Vdc.

For example, the inverter 61 is a voltage source inverter, and three current paths (not shown) are connected in parallel to the capacitor 62. In each of the current paths, two switching elements (not shown) are provided.

An active filter control device 7 includes a transformer 701, a phase detector 702, dq converters 703 and 711, high-pass filters 704 and 705, subtracters 707, 712, and 713, proportional-integral controllers 708, 714, and 715, adders 709, 718, and 719, and repetitive controllers 716 and 717.

The transformer 701 detects one phase of a three-phase voltage Vs of the AC power supply 1 and provides this to the phase detector 702. The phase detector 702 transmits a phase wt detected to the dq converters 703 and 711.

The dq converter 703 performs three-phase/two-phase conversion on the detected load current Io. A d-axis and a q-axis are axes in a rotating coordinate system rotating in synchronization with the phase detected by the phase detector 702.

On this occasion, the load current Io has three phases, and thus, when load currents ir and it for two phases of them are detected, a d-axis component and a q-axis component of the load current Io can be obtained. FIG. 1 illustrates a case in which the load currents ir and it for two phases are detected as described above.

The dq converter 711 performs three-phase/two-phase conversion on the detected compensating current Ic, thereby obtaining a d-axis current id and a q-axis current iq. On this occasion, the compensating current Ic also has three phases, and thus, when two phases of them are detected, the d-axis current id and the q-axis current iq can be obtained. FIG. 1 illustrates a case in which currents for two phases are detected as described above.

The high-pass filters 704 and 705 eliminate DC components of the d-axis component and the q-axis component, respectively, of the load current Io.

The components of the load current Io, which are synchronized with the phase of the AC power supply 1, appear as the DC components in both of the d-axis component and the q-axis component. In other words, if the load current Io has no harmonic components, the d-axis component and the q-axis component are DC. The high-pass filters 704 and 705 thus output only harmonic components of the d-axis component and the q-axis component of the load current Io.

The d-axis current id and the q-axis current iq of the compensating current Ic absorb the harmonic components of the load current Io when they match the harmonic components of the load current Io with no phase shift, so that no harmonic components are generated in the power current Is. Thus, if a modification to the d-axis described below is ignored, the high-pass filters 704 and 705 can be said to output the command values of the d-axis current id and the q-axis current iq of the compensating current Ic.

A command value iq* of the q-axis current iq can be obtained from the high-pass filter 705. For the command value iq* of the q-axis current iq, alternatively, the configuration is made such that a DC component of the g-axis current iq is also compensated without the use of the high-pass filter 705, thereby improving a displacement power factor.

Meanwhile, for a command value id* of the d-axis current id, the output of the high-pass filter 704 is modified so as to accommodate variations in the DC voltage Vdc. Specifically, a modification is made as described below.

The subtracter 707 obtains a deviation between the DC voltage Vdc supported by the capacitor 62 and a command value Vdc* thereof. The proportional-integral controller 708 performs proportional integral control on the deviation obtained from the subtracter 707 to obtain a modified value. The adder 709 adds the modified value and the output of the high-pass filter 704. As a result, the d-axis current command value id* that is little affected by the variations in the DC voltage Vdc is obtained from the adder 709.

The subtracters 712 and 713 output deviations Δid and Δiq, respectively. The deviation Δid is obtained by subtracting the d-axis current id from the command value id*. The deviation Δiq is obtained by subtracting the q-axis current iq from the command value iq*.

The proportional-integral controllers 714 and 715 respectively perform proportional integral control on the deviations Δid and Δiq, thereby outputting values ido and iqo being results of the proportional integral operation.

The repetitive controller 716, in cooperation with the adder 718, totals the value ido for each cycle of the command value id* to output a voltage command value Vid. The repetitive controller 717, in cooperation with the adder 719, totals the value iqo for each cycle of the command value iq* to output a voltage command value Viq. In other words, the repetitive controller 716 and the adder 718 can be considered collectively to be a totaling unit, and the repetitive controller 717 and the adder 719 can be considered collectively to be a totaling unit.

For example, the AC power supply 1 supplies a three-phase voltage herein, and accordingly, in a steady state, the command values id* and iq* have a cycle ⅙-times the cycle of the three-phase voltage and are synchronized with the three-phase voltage.

A drive signal generation circuit 8 generates a drive signal G for driving the parallel active filter 6 based on the voltage command values Vid and Viq. The configuration of the drive signal generation circuit 8 that functions as described above is well known, and thus is not described here.

The voltage command values Vid and Viq indirectly control the parallel active filter 6. Thus, the configuration including the load 2, the interconnection reactor 4, the parallel active filter 6, and the drive signal generation circuit 8 is considered to be a to-be-controlled system, and it can be said that the active filter control device 7 is a control device that controls the to-be-controlled system.

Herein, the observable amount obtained from the to-be-controlled system can be considered to be the compensating current Ic (in particular, the d-axis current id and the q-axis current thereof), target values of the observable amount can be considered to be the command values id* and iq*, and control inputs can be considered to be the voltage command values Vid and Viq.

A low-pass filter 9 is desirably provided between, for example, the interconnection reactor 4 and the transformer 701 from the viewpoint of removing ripples of the compensating current Ic. Although only one phase part is illustrated in the low-pass filter 9 herein, three phase parts are actually provided.

In the illustration of the present embodiment, the load 2 is an air conditioner including an inverter 23 and a compressor 24 that is controlled by the inverter 23 to compress a refrigerant (not shown). The load 2 further includes a converter 21 for supplying DC power to the inverter 23 and a low-pass filter 22 interposed in parallel between the converter 21 and the inverter 23.

With the above-mentioned configuration, if variations in command value become abrupt cyclically, the control input and eventually the observable amount follow the cyclically abrupt change with high responsiveness. More detailed description is given below.

Figure 2:
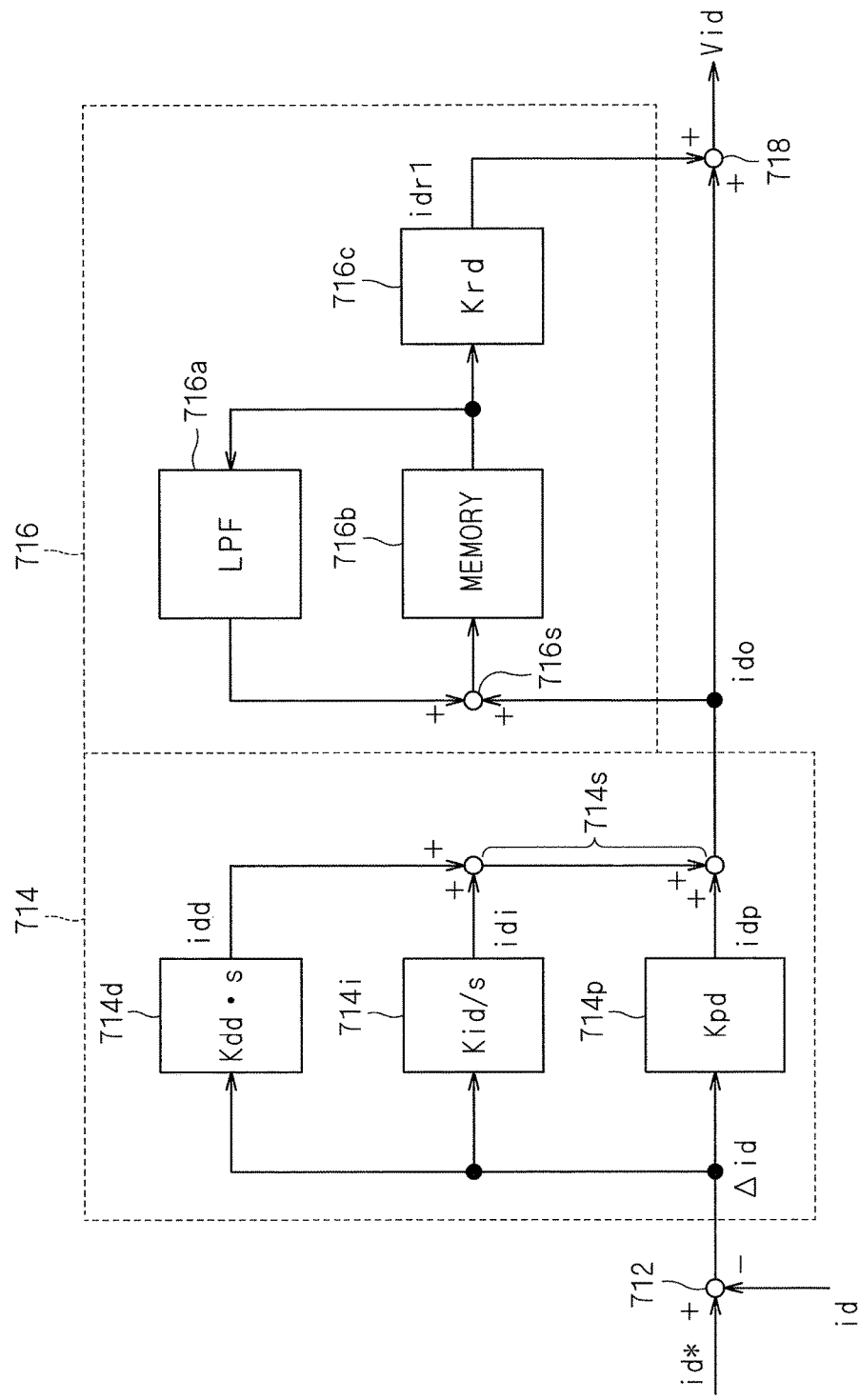
FIGS. 2 and 3 are block diagrams each showing configurations of a proportional-integral controller and a repetitive controller.

FIG. 2 is a block diagram showing the configurations of the proportional-integral controller 714 and the repetitive controller 716 together with the connection relationships with the adder 718 and the subtracter 712. The proportional-integral controller 714 processes the deviation Δid, and is thus also referred to as a deviation processing unit below. The deviation processing unit 714 includes a proportional computing unit 714*p*, an integral computing unit 714*i*, and an adder 714*s*.

The proportional computing unit 714*p* outputs a result idp obtained by multiplying the deviation Δid between the command value id* and the d-axis current id by a gain Kpd.

The integral computing unit 714*i* outputs a value idi obtained by multiplying an integral of the deviation Δid by a gain Kid.

The adder 714*s* adds at least an output of the proportional computing unit 714*p* and an output of the integral computing unit 714*i* to output a value ido.

The repetitive controller 716 repeatedly accumulates the value ido for each cycle of the command value id* to output a value idr1 obtained by multiplying the result of the accumulation by a gain Krd.

The adder 718 adds the value idr1 output from the repetitive controller 716 and the value ido output from the adder 714*s* to output a voltage command value Vid.

Figure 3:
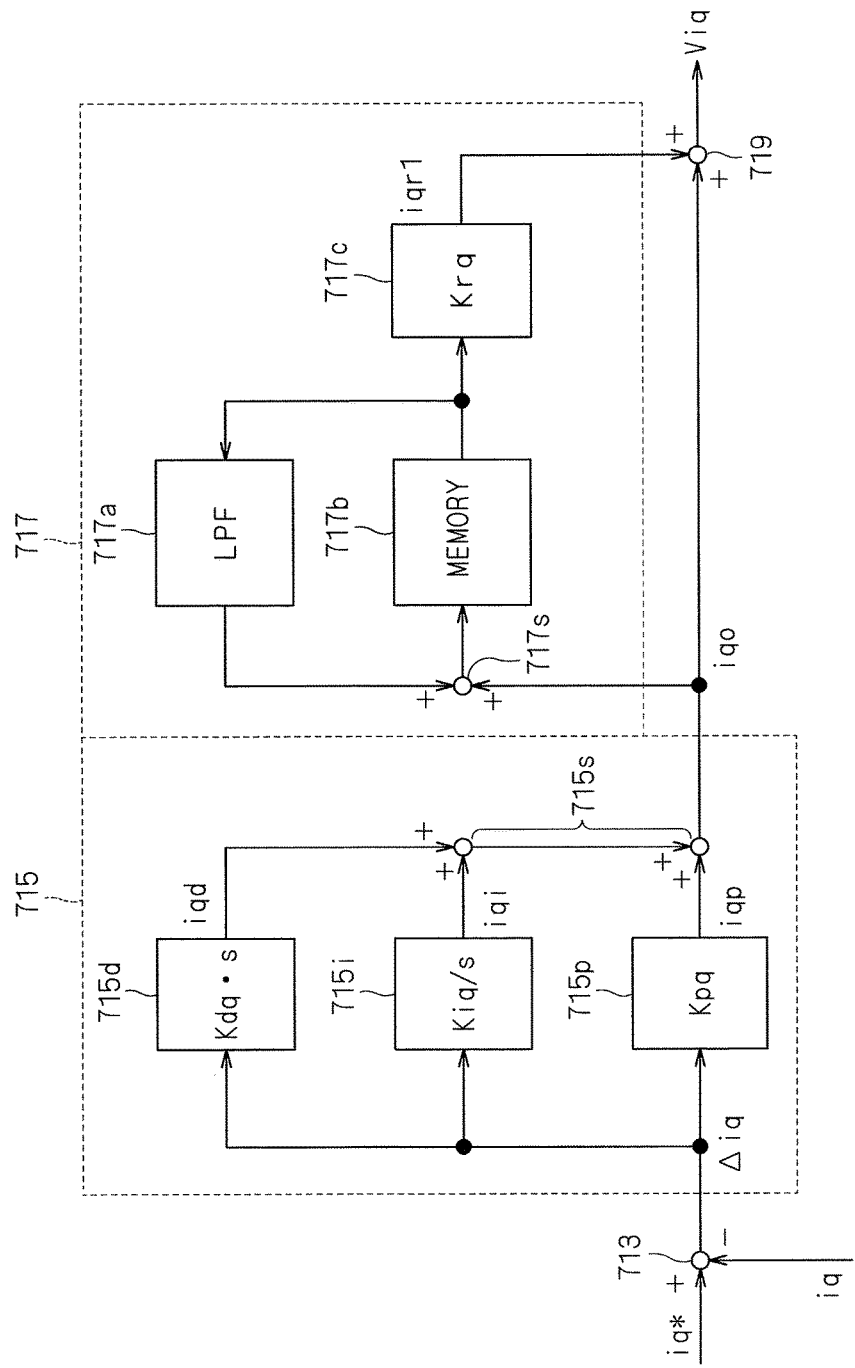

FIG. 3 is a block diagram showing the configurations of the proportional-integral controller 715 and the repetitive controller 717 together with the connection relationships with the adder 719 and the subtracter 713. The proportional-integral controller 715 processes the deviation Δiq, and is thus also referred to as a deviation processing unit below. The deviation processing unit 715 includes a proportional computing unit 715p, an integral computing unit 715i, and an adder 715s.

The proportional computing unit 715p outputs a result iqp obtained by multiplying the deviation Δiq between the command value iq* and the q-axis current iq by a gain Kpq.

The integral computing unit 715i outputs a value iqi obtained by multiplying the integral of the deviation Δiq by a gain Kiq.

The adder 715s adds at least an output of the proportional computing unit 715p and an output of the integral computing unit 715i to output a value iqo.

The repetitive controller 717 repeatedly accumulates the value iqo for each cycle of the command value iq* and outputs a value iqr1 obtained by multiplying the result of the accumulation by a gain Krq.

The adder 719 adds the value iqr1 output from the repetitive controller 717 and the value iqo output from the adder 715s to output a voltage command value Viq.

The deviation processing units 714 and 715 operate in accordance with a predetermined control timing shorter than the power cycle.

In the present embodiment, not only the value idi is obtained by integrating the deviation Δid in accordance with the control timing, but also the value is further integrated by the repetitive controller 716 for each cycle of the command value id*. Additionally, not only the value iqi is obtained by integrating the deviation Δiq in accordance with the control timing, but also the value is further integrated by the repetitive controller 717 for each cycle of the command value iq*. Consequently, if the fluctuations in the command values id* and iq* become cyclically abrupt, the voltage command values Vid and Viq and eventually the compensating current Ic follow the cyclically abrupt change with high responsiveness. This contributes to a reduction in the harmonic components of the power current Is.

Figure 4:
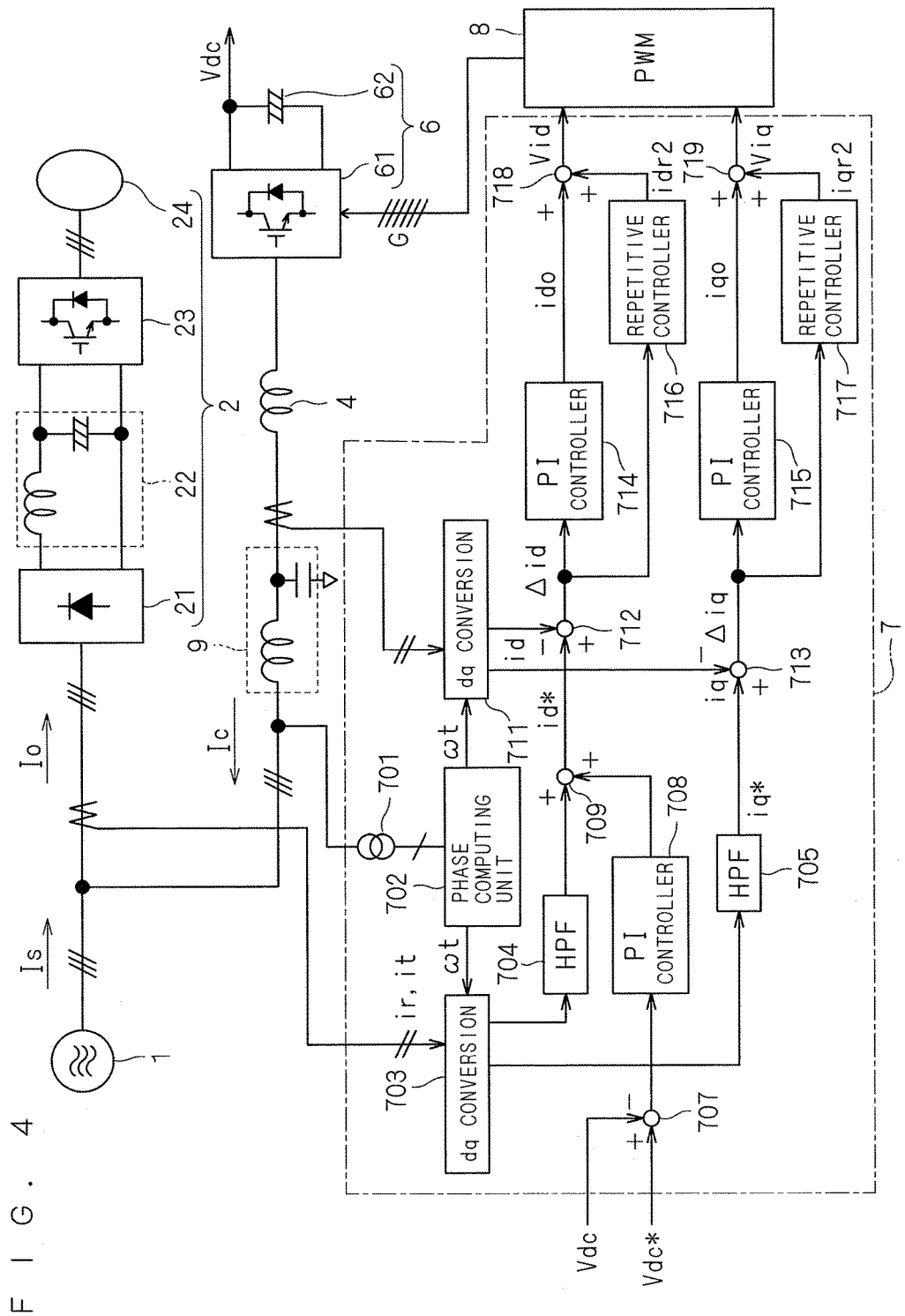
FIG. 4 is a block diagram showing an example of a comparative technology.

Such an effect is now described through comparison with another technology. FIG. 4 is a block diagram showing an example of the other technology (hereinafter, referred to as a "comparative technology"). The configuration in the comparative technology differs from the configuration shown in FIG. 1 only in that the inputs to the repetitive controllers 716 and 717 are not the values ido and iqo output from the proportional-integral controllers 714 and 715 but are changed to the deviations Δid and Δiq, respectively.

In other words, the outputs of the deviation processing units 714 and 715 are totaled to generate the voltage command values Vid and Viq in the technology according to the present embodiment, whereas in the comparative technology, the deviations Δid and Δiq are totaled for the outputs of the deviation processing units 714 and 715 to generate the voltage command values Vid and Viq. To clarify this difference, different symbols are adopted such that the values output from the repetitive controllers 716 and 717 are the values idr1 and iqr1 in FIG. 1 and are values idr2 and iqr2 in FIG. 4.

Figure 5:
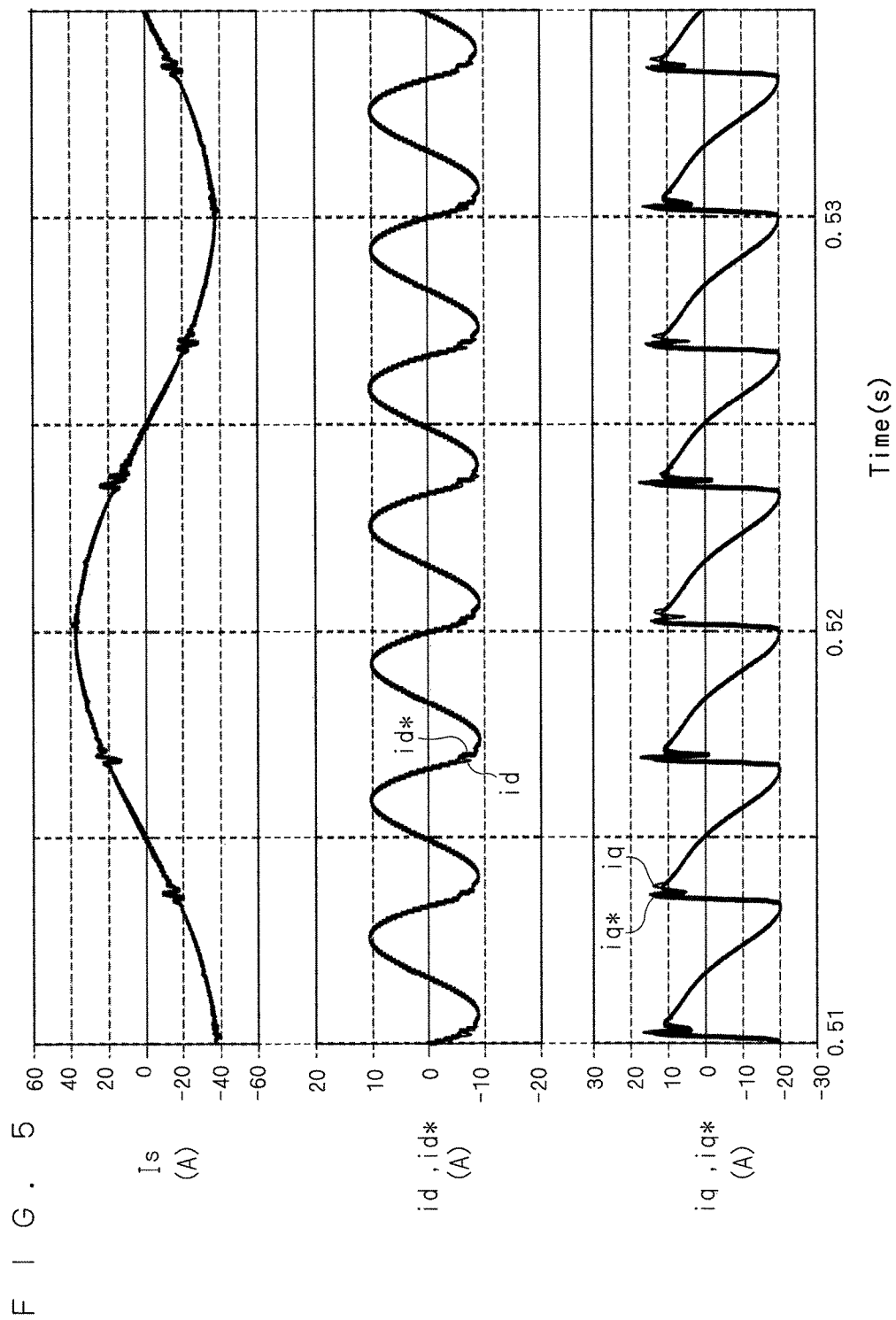
FIG. 5 is a graph showing waveforms of various amounts in the technology according to the present embodiment.
Figure 6:
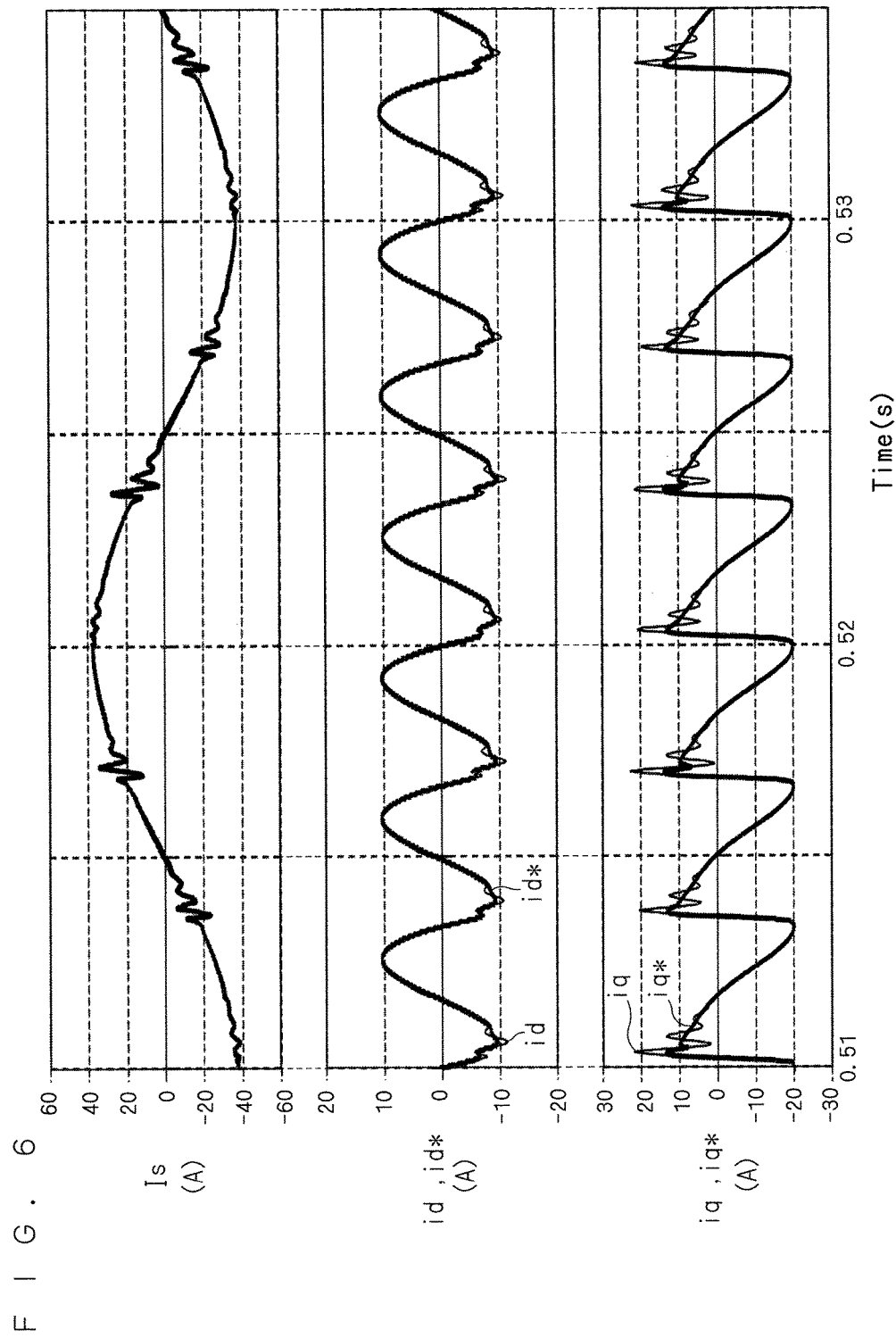
FIG. 6 is a graph showing waveforms of various amounts in the comparative technology.

FIG. 5 is a graph showing the waveforms of various amounts in the technology according to the present embodiment. FIG. 6 is a graph showing the waveforms of various amounts in the comparative technology. In both of the figures, the first stage, the second stage, and the third stage from the top represent the power current Is, the d-axis current id and the command value id* thereof, and the q-axis current iq and the command value iq* thereof, respectively. A time is used in the horizontal axis.

As can be seen from FIG. 5, in the technology according to the present embodiment, the d-axis current id well follows the command value id* thereof, and the q-axis current iq well follows the command value iq* thereof. In particular, though the command value iq* of the q-axis current iq shows a cyclically abrupt change, their waveforms nearly overlap each other.

In contrast, as can be seen from FIG. 6, in the comparative technology, the waveform of the d-axis current id nearly overlaps the waveform of the command value id* thereof, but the ringing of the q-axis current iq is large at the time when the command value iq* thereof shows a cyclically abrupt change.

The harmonic components of the power current Is are reduced more in the adoption of the technology according to the present embodiment than in the adoption of the comparative technology, which results from the behavior of the q-axis current iq as described above.

In the technology according to the present embodiment, as described above, this effect results from a fact that the values idi and iqi obtained by integrating the deviations Δid and Δiq at the control timing are further integrated by the repetitive controllers 716 and 717 for each cycle of the command values id* and iq*.

In an unstable situation such as upon startup, however, this may lead to a phenomenon in which ringing conversely increases.

Figure 7:
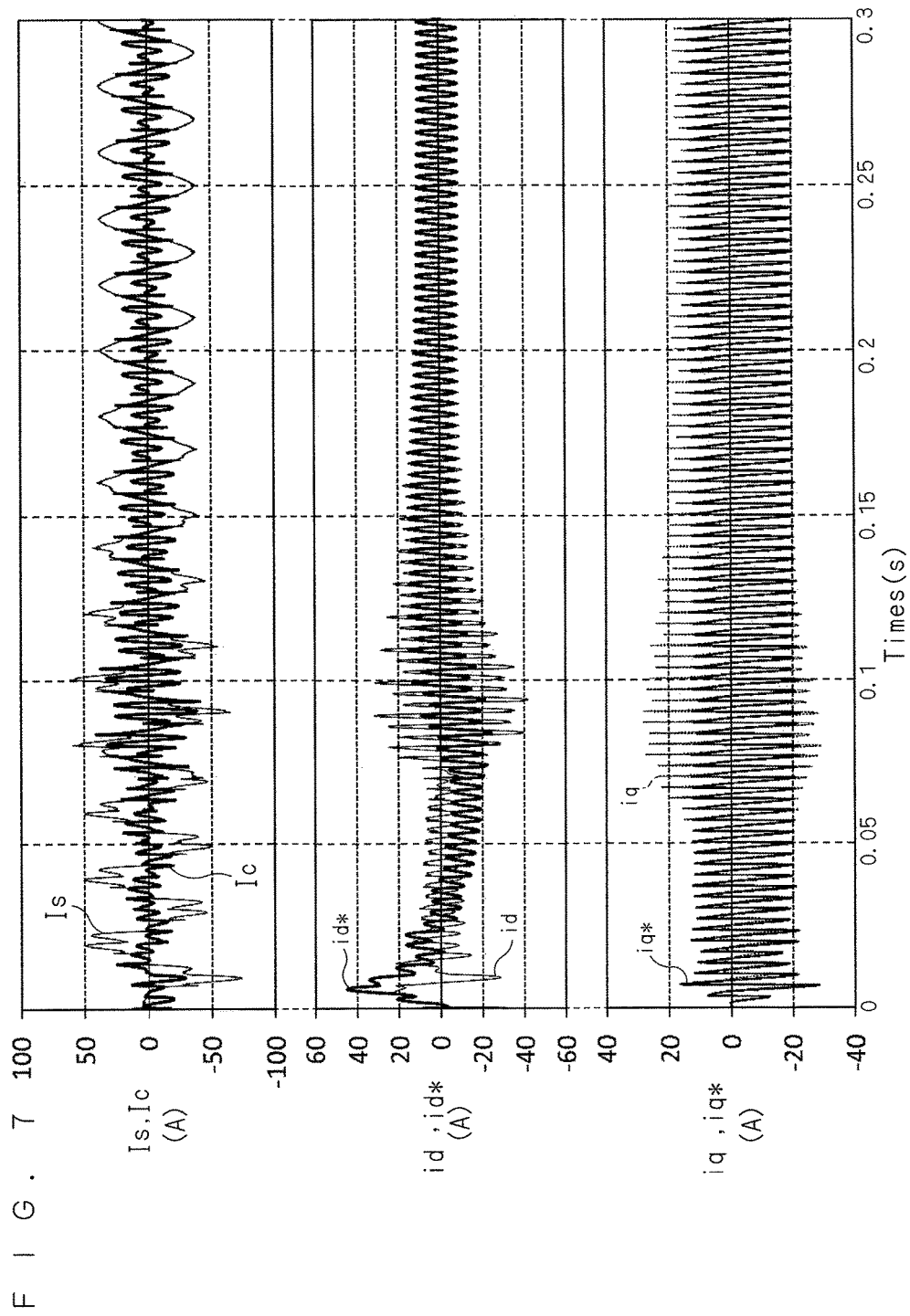
FIGS. 7 to 12 are graphs each showing waveforms of various amounts in the technology according to the present embodiment.
Figure 8:
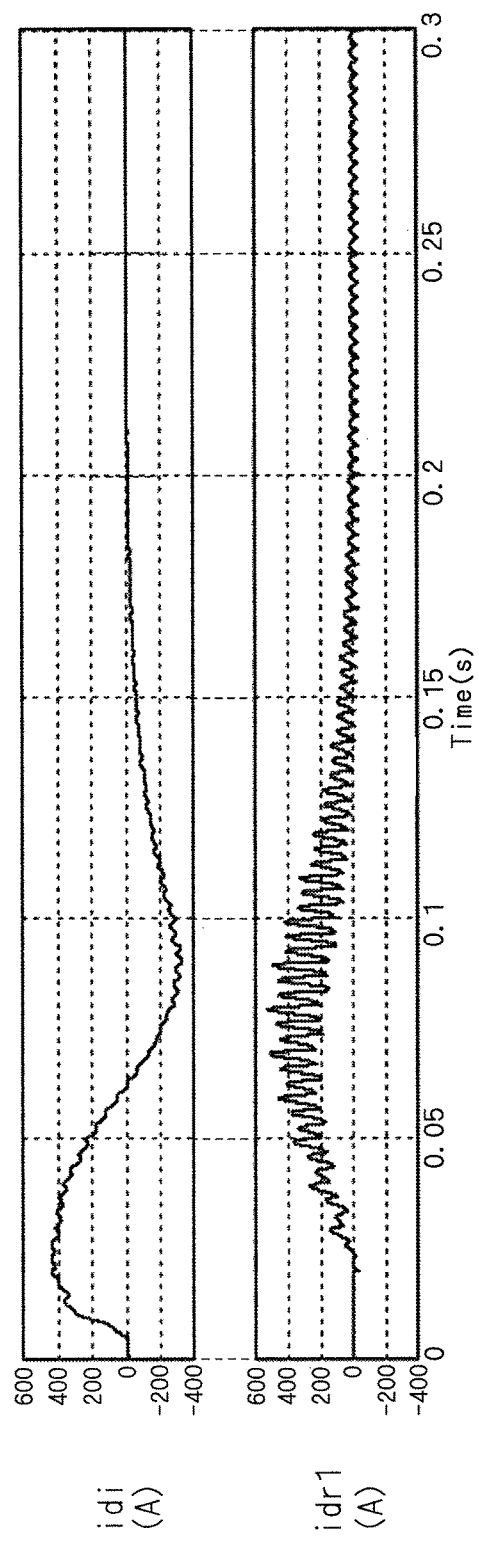

FIGS. 7 and 8 are graphs showing various amounts immediately after startup of the to-be-controlled system when the technology according to the present embodiment is adopted. A time starting from the startup is used in the horizontal axis.

The first stage, the second stage, and the third stage form the top of FIG. 7 represent the power current Is and the compensating current Ic, the d-axis current id and the command value id* thereof, and the q-axis current iq and the command value iq* thereof, respectively. The first stage and the second stage from the top of FIG. 8 represent the value idi output from the integral computing unit 714i and the value idr1 output from the repetitive controller 716, respectively.

The property of the d-axis current to follow the command value id* is much poorer immediately after startup than in the steady state. This is also reflected in the waveforms of the values idi and idr1. In particular, after a lapse of about 0.02 second from startup, the d-axis current id has a phase opposite to that of the command value id*. Further, the d-axis current id has the same phase as that of the command value id* after a lapse of about 0.07 second from startup, but a discrepancy therebetween is large until about 0.15 second elapses from startup. Thus, high harmonic components in the waveform of the power current Is are large until the steady state is reached.

Although the q-axis current iq immediately after startup has the same phase as that of the command value iq*, a discrepancy between the command value iq* and itself is larger than in the steady state (particularly at the time when the command value iq* abruptly changes).

The phenomenon immediately after startup resulting from the operations of the integral computing units 714i and 715i can be confirmed by setting the gains Kid and Kiq to zero.

Figure 9:
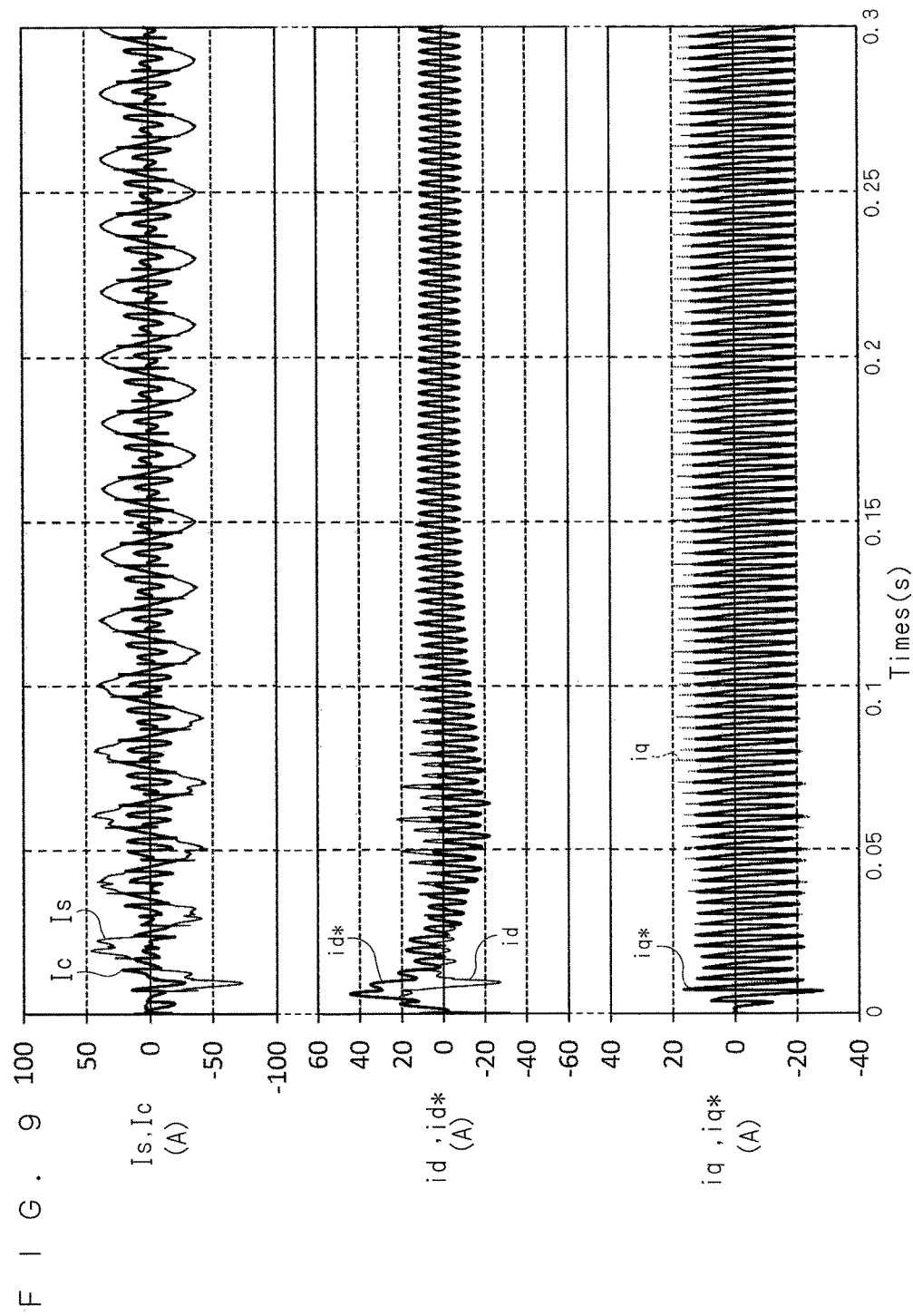
Figure 10:
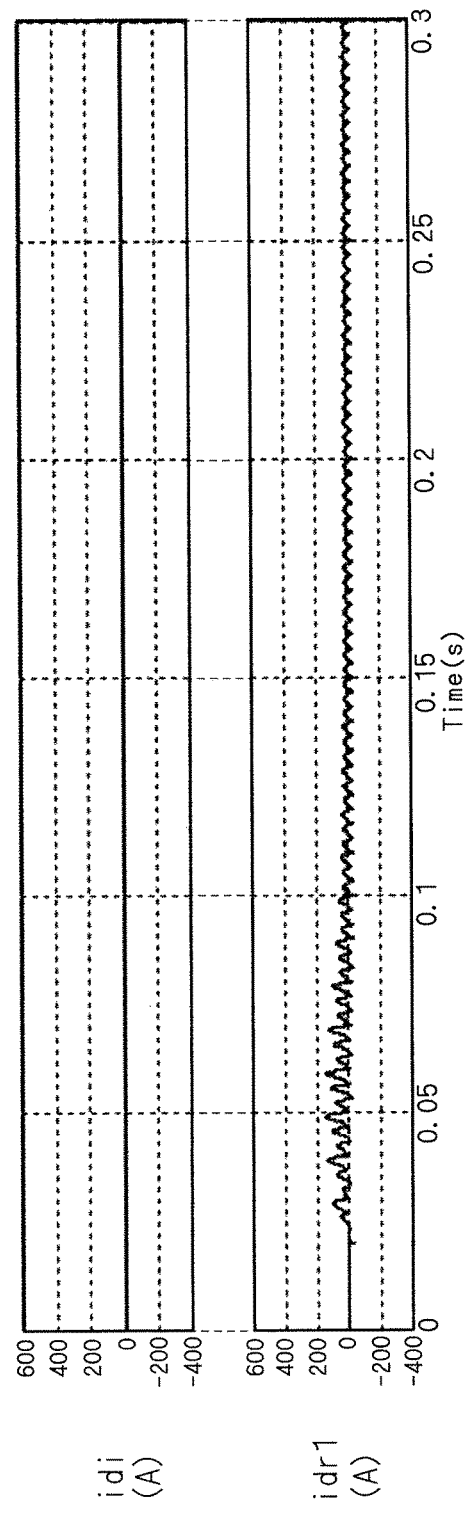

FIGS. 9 and 10 are graphs showing various amounts immediately after startup of the to-be-controlled system when the technology according to the present embodiment is adopted and the gains Kid and Kiq are set to zero. A time starting from startup is used in the horizontal axis.

As in FIGS. 7 and 8, FIGS. 9 and 10 show the power current Is, the compensating current Ic, the d-axis current id and the command value id* thereof, the q-axis current iq and the command value iq* thereof, the value idi and the value idr1.

The gain Kid is set to zero, and thus, the value idi is zero. Setting the value idi to zero as described above results in a small discrepancy between the d-axis current id and the command value id*. Similarly, a discrepancy between the q-axis current iq and the command value iq* is also reduced.

Therefore, the gains Kid and Kiq are desirably set to zero during a period required for a shift to the steady state from immediately after startup, herein, for 0.15 second. That is, after startup of the to-be-controlled system, when the integral computing units 714i and 715i operate after a lapse of a predetermined time, the ringings of the d-axis current id and the q-axis current iq are reduced from immediately after startup, eventually contributing to the suppression of the harmonic components of the power current Is.

Figure 11:
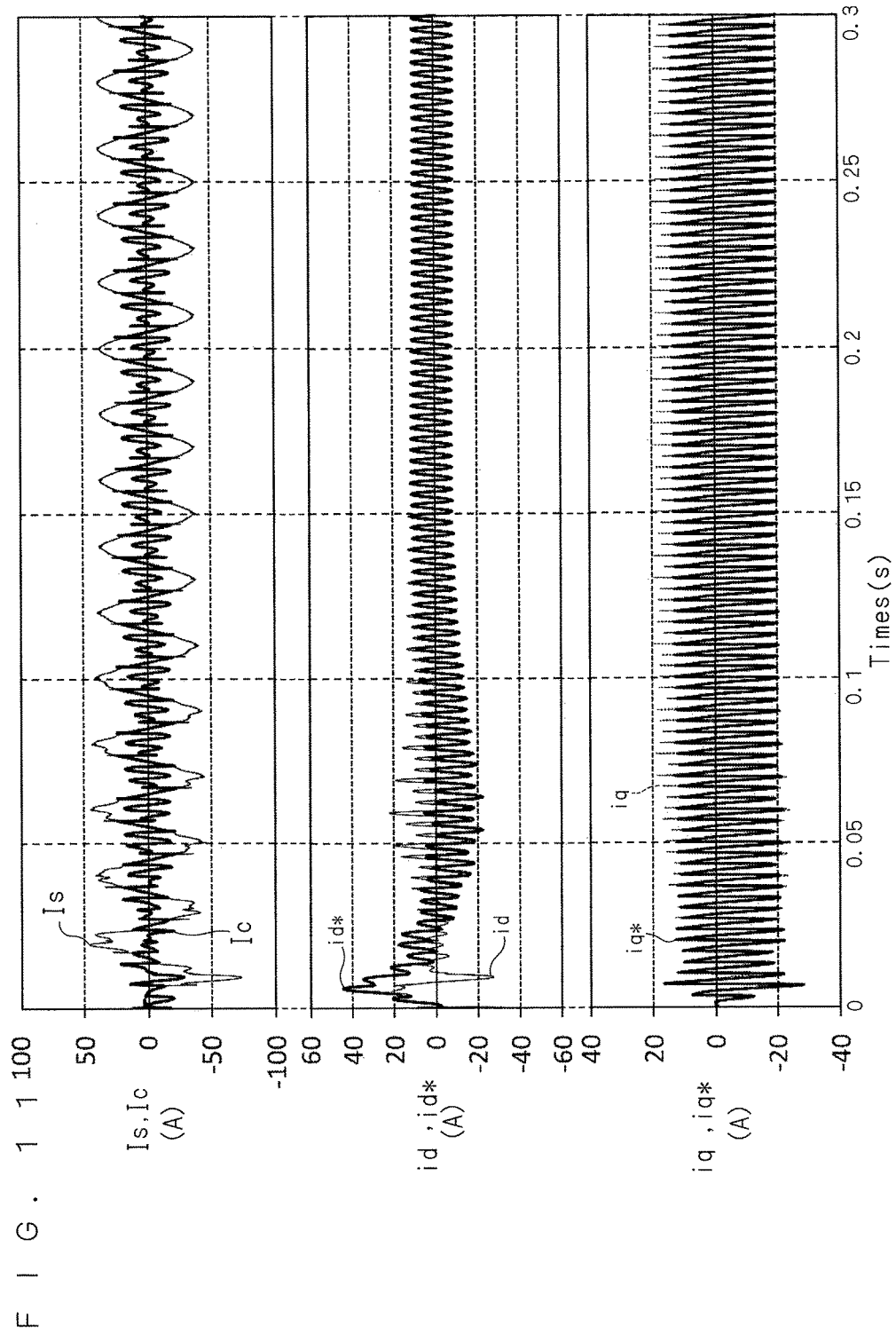
Figure 12:
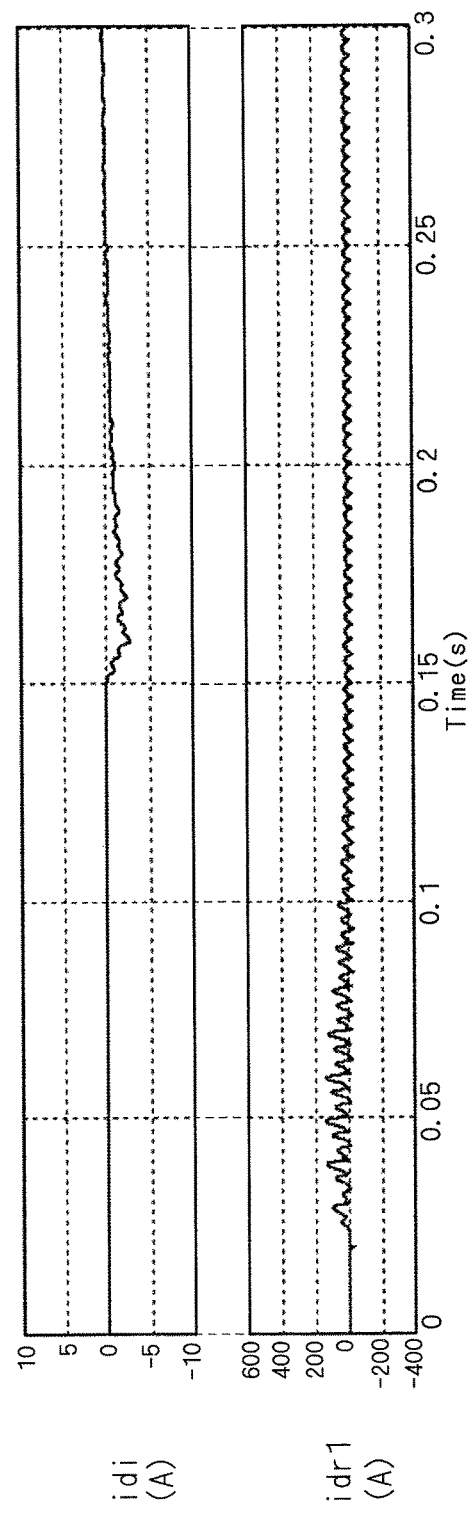

FIGS. 11 and 12 are graphs showing various amounts immediately after startup of the to-be-controlled system when the technology according to the present embodiment is adopted and the gains Kid and Kiq are set to zero only during a period until 0.15 second passes from startup. A time starting from startup is used in the horizontal axis.

As in FIGS. 7, 8, 9, and 10, FIGS. 11 and 12 show the power current Is, the compensating current Ic, the d-axis current id and the command value id* thereof, the q-axis current iq and the command value iq* thereof, the value idi and the value idr1.

The waveforms shown in FIGS. 11 and 12 match the waveforms shown in FIGS. 9 and 10 during a period until 0.15 second elapses from startup and, after a lapse of 0.15 second from startup, approximately match the waveforms shown in FIGS. 7 and 8.

Considering that an integration operation cannot be performed immediately after startup during a predetermined period, the technology according to the present embodiment is seemingly inferior to the comparative technology, but it is not. This is because, as described below, the operation desired in the steady state should not be performed immediately after startup during a predetermined period also in the comparative technology.

Figure 13:
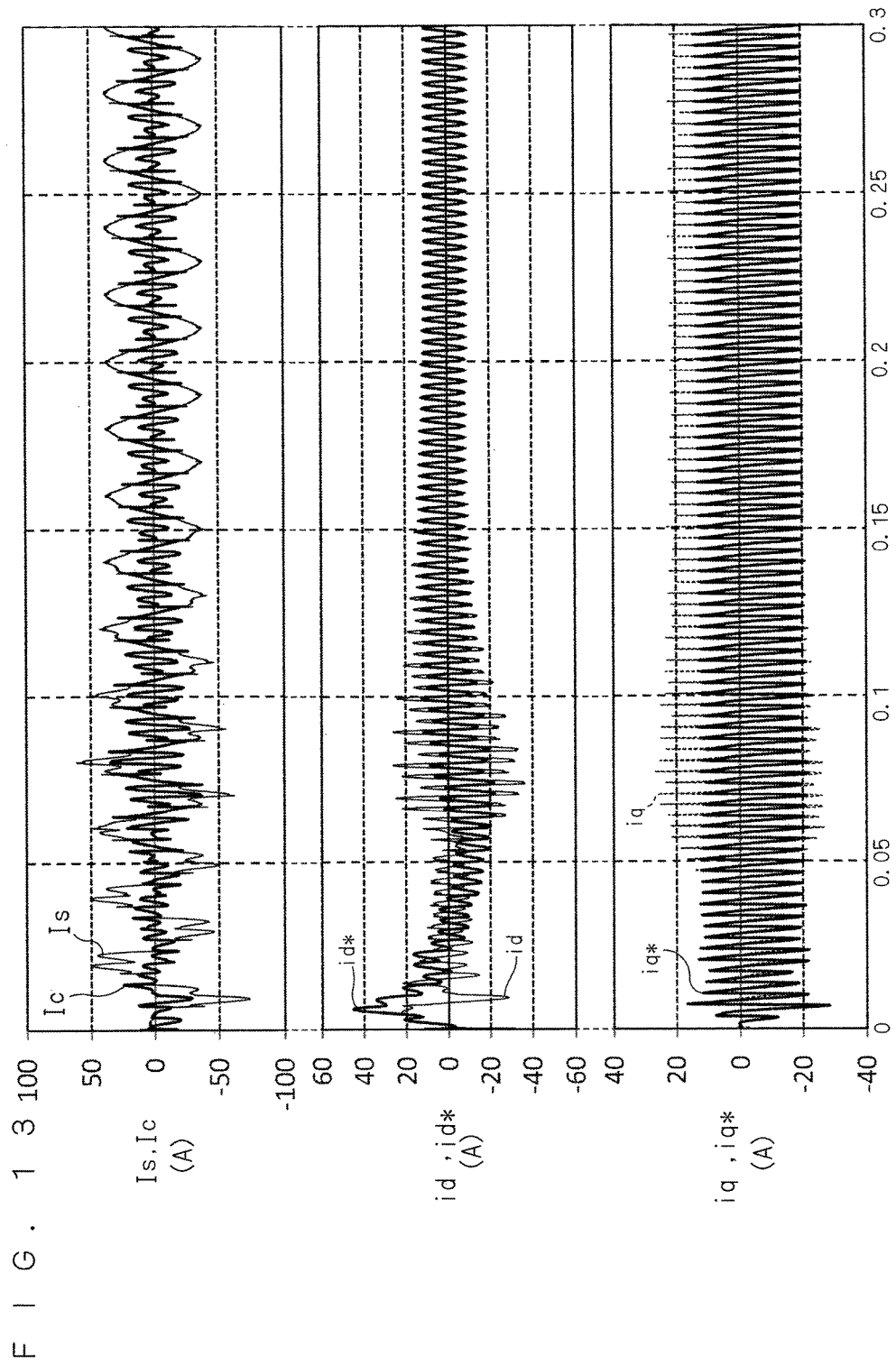
FIGS. 13 to 18 are graphs each showing waveforms of various amounts in the comparative technology.
Figure 14:
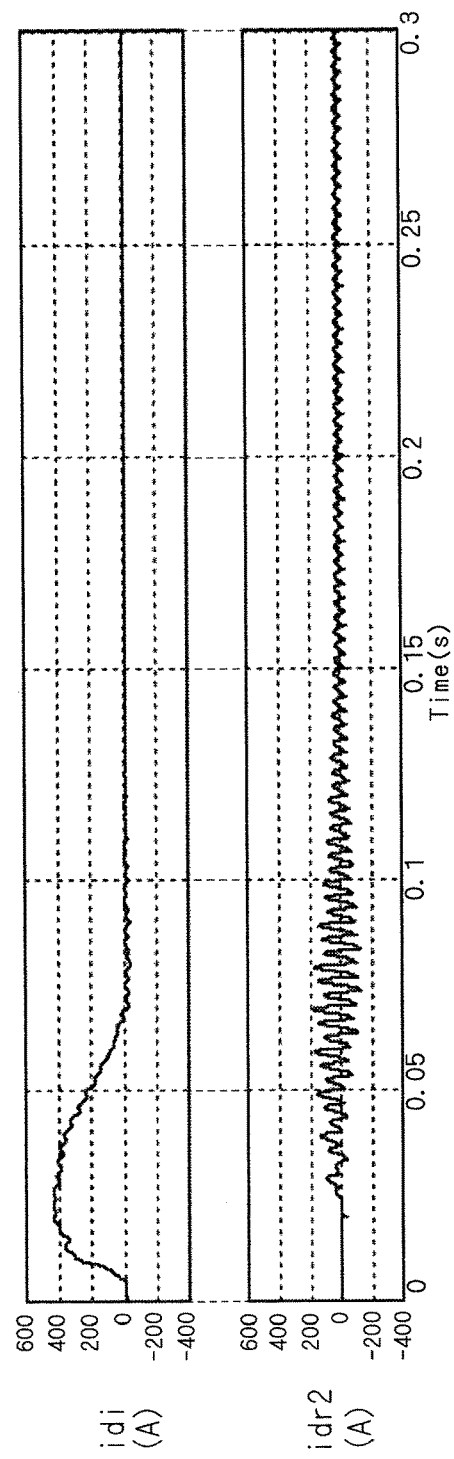
Figure 15:
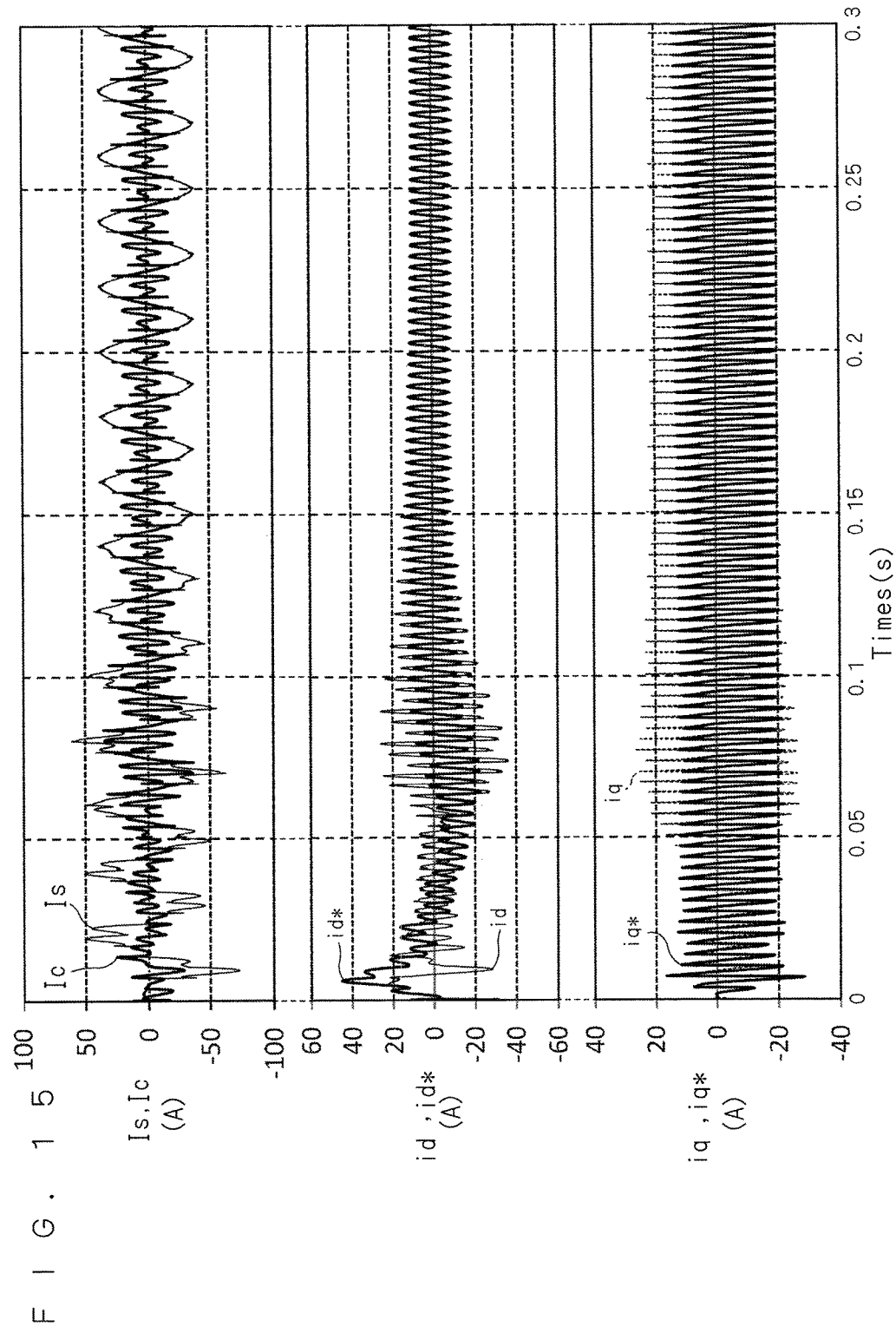
Figure 16:
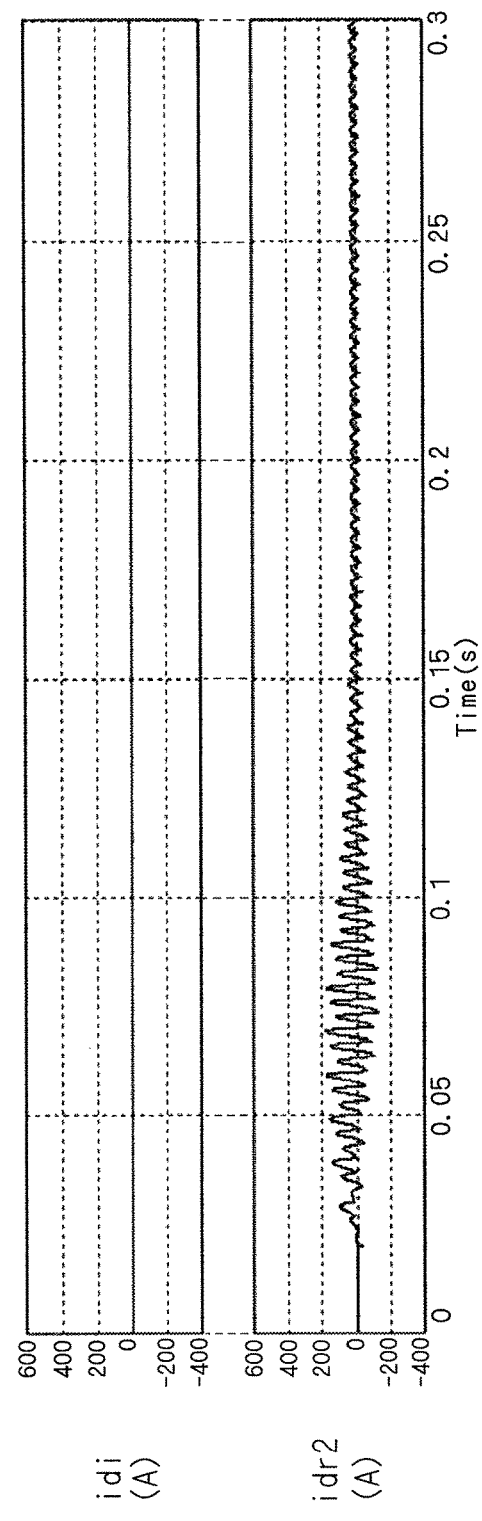

FIGS. 13 and 14 are graphs showing various amounts immediately after startup of the to-be-controlled system in the comparative technology (see FIG. 4). FIGS. 15 and 16 are graphs showing various amounts immediately after startup of the to-be-controlled system when the gains Kid and Kiq are set to zero only during a period until 0.15 second elapses from startup in the comparative technology. In all of the figures, a time starting from startup is used in the horizontal axis.

As in FIGS. 7 to 12, FIGS. 13 to 16 show the power current Is, the compensating current Ic, the d-axis current id and the command value id* thereof, the q-axis current iq and the command value iq* thereof, the value idi and the value idr2.

With the comparison between FIGS. 13 and 14 and FIGS. 15 and 16, a discrepancy between the d-axis current id and the command value id* and a discrepancy between the q-axis current iq and the command value iq* differ little but differ remarkably immediately after startup. In other words, the discrepancies little depend on the gains Kid and Kiq. This is a natural consequence because as opposed to the technology according to the present embodiment, in the comparative technology, the values idi and iqo output from the integral computing units 714i and 715i are not accumulated by the repetitive controllers 716 and 717.

In the comparative example, therefore, to reduce a discrepancy between the d-axis current id and the command value id* and a discrepancy between the q-axis current iq and the command value iq* and eventually suppress the harmonic components of the power current Is, it is desirable to stop the operations of the repetitive controllers 716 and 717 (specifically, set the gains Krd and Krq to zero) during a predetermined period from startup.

Figure 17:
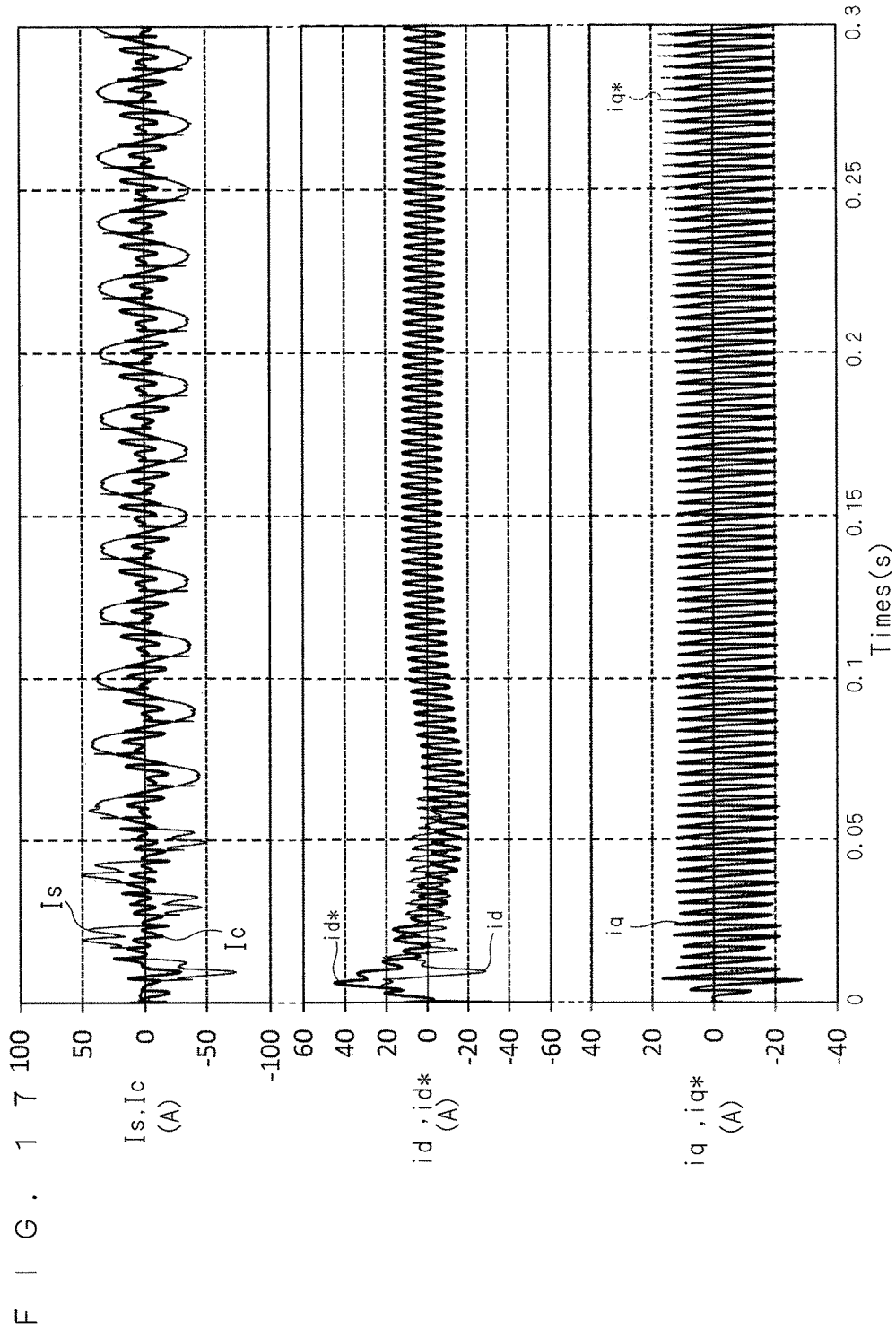
Figure 18:
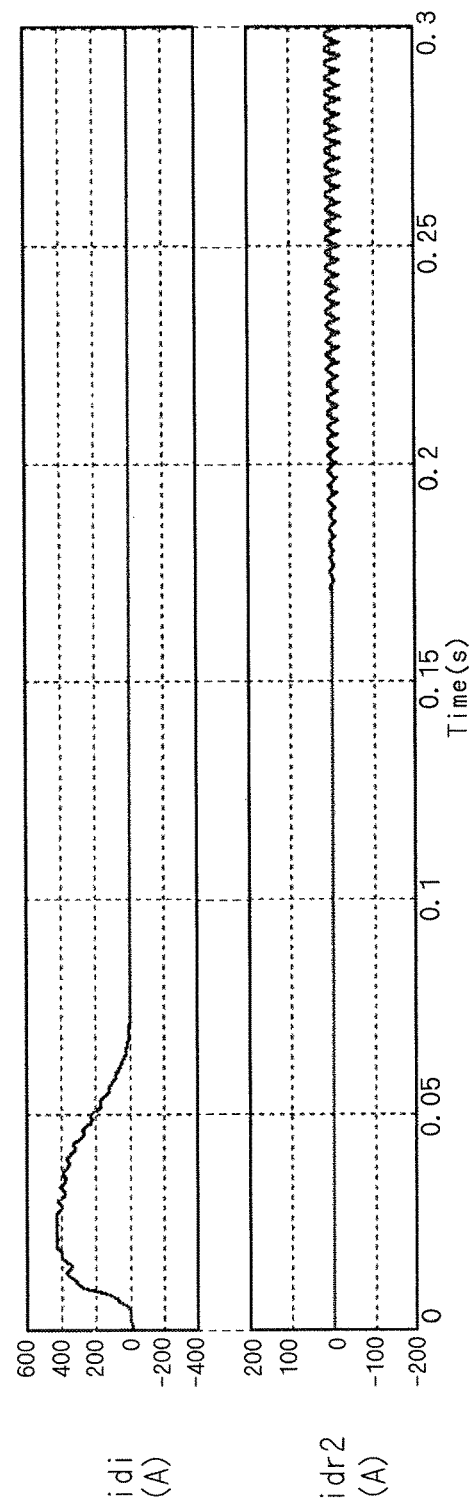

FIGS. 17 and 18 are graphs showing various amounts immediately after startup of the to-be-controlled system when the comparative technology is adopted and the gains Krd and Krq are set to zero only during a period until 0.15 second elapses from startup. A time starting from startup is used in the horizontal axis.

With reference to FIGS. 17 and 18, the idr2 is zero because the gains Krd and Krq are set to zero during a period until 0.15 second elapses from startup.

With reference to FIGS. 17 and 18, the period in which the d-axis current id has a phase opposite to that of the command value id* continues until a lapse of 0.07 second from startup but, thereafter, a discrepancy therebetween decreases. A discrepancy between the q-axis current iq and the command value iq* also decreases.

As described above, the operation desired in the steady state should not be performed immediately after startup even in the comparative technology. The technology according to the present embodiment is thus not inferior to that of the comparative technology.

Referring back to FIGS. 2 and 3, the deviation processing units 714 and 715 are described additionally.

As described above, the repetitive controllers 716 and 717, in cooperation with the adders 718 and 719, total the values ido and iqo for each cycle of the command values id* and iq* to output the voltage command values Vid and Viq, respectively. Specifically, the adder 718 adds the value idr1 output from the repetitive controller 716 and the value ido output from the adder 714s to output the voltage command value Vid. The adder 719 adds the value iqr1 output from the repetitive controller 717 and the value iqo output from the adder 715s to output the voltage command value Viq.

The values ido and idr1 to be added by the adder 718, however, may correspond to different phases in the cycle. The values iqo and iqr1 to be added by the adder 719 may correspond to different phases in the cycle. Such an approach contributes to a reduction in the harmonic components of the power current Is when, for example, the frequency at the control timing for controlling the operations of the deviation processing units 714 and 715 is not an integral multiple of the frequency of the power. Performing accumulation and repetitive control on values having different phases per se is made public, for example, in Japanese Patent Application Laid-Open No. 2001-186752.

In the present embodiment, specifically, a first phase and a second phase different from each other are set in the cycle. The adder 718 adds a value idr1 in the first phase and a value ido in the second phase to output a voltage command value Vid. The adder 719 adds a value idq1 in the first phase and a value iqo in the second phase to output a voltage command value Viq.

If the variations in the command values id* and iq* become cyclically abrupt, the first phase and the second phase can be selected such that the voltage command values Vid and Viq and eventually the d-axis current id and the q-axis current iq of the compensating current Ic follow such a cyclically abrupt change with high responsiveness. The first phase and the second phase can be set by controlling the repetitive controllers 716 and 717 using a phase wt detected by the phase detector 702.

The deviation processing unit 714 desirably further includes a differential computing unit 714d. The differential computing unit 714d differentiates a deviation Δid and outputs a result idd obtained by multiplying a result of the differentiation by a gain Kdd. Then, the adder 714s adds and outputs a value idp output from the proportional computing unit 714p, a value idi output from the integral computing unit 714i, and a value idd output from the differential computing unit 714d.

The deviation processing unit 715 desirably further includes a differential computing unit 715d. The differential computing unit 715d differentiates a deviation Δiq and outputs a result iqd obtained by multiplying a result of the differentiation by a gain Kdq. Then, the adder 715s adds and outputs a value iqp output from the proportional computing unit 715p, a value iqi output from the integral computing unit 715i, and a value iqd output from the differential computing unit 715d.

Such a configuration enhances the stability in the to-be-controlled system for the known reason.

The repetitive controller 716 includes, for example, a delay unit 716b, an adder 716s, and a multiplier 716c.

The delay unit 716b outputs an input value with a delay by the cycle of the command value id* and is illustrated in FIG. 2 where a memory is adopted. The adder 716s obtains sum of an output of the adder 714s and an output of the delay unit 716b and input the sum to the delay unit 716b. The multiplier 716c multiplies an output of the delay unit 716b by a gain Krd to obtain an output of the repetitive controller 716.

The repetitive controller 717 includes, for example, a delay unit 717b, an adder 717s, and a multiplier 717c.

The delay unit 717b outputs an input value with a delay by the cycle of the command value iq* and is illustrated in FIG. 3 where a memory is adopted. The adder 717s obtains sum of an output of the adder 714s and an output of the delay unit 717b and input the sum to the delay unit 717b. The multiplier 717c multiplies an output of the delay unit 717b by a gain Krq to obtain an output of the repetitive controller 717.

The adders 716s and 717s desirably add the outputs of the delay units 716b and 717b, on which low-pass transmission processing has been performed, and the outputs of the adders 714s and 715s. This is because unstabilization in a high-frequency band, such as resonance between a source impedance and the capacitor of the low-pass filter 9, is prevented, thereby enhancing the stability in the to-be-controlled system.

For such low-pass transmission processing, for example, low-pass filters 716a and 717a are provided in the repetitive controllers 716 and 717.

The description above is illustrative, and the present disclosure is not limited to the description above. The elements may be combined with each other or omitted as long as the operation of the present disclosure is not impaired. For example, the low-pass filters 717a and 716a may be omitted.

Considering that the behavior of the q-axis current iq shown in FIG. 7 is not disordered as much as the behavior of the d-axis current id, the deviation processing unit 715 does not have to set the gain Kiq to zero while the deviation processing unit 714 sets the gain Kid to zero during a predetermined period immediately after startup.

While the disclosure has been shown and described in detail, the foregoing description is in all aspects illustrative and not restrictive. It is therefore understood that numerous modifications and variations can be devised without departing from the scope of the disclosure.

The invention claimed is:

1. A control device outputting, to a to-be-controlled system which operates based on a control input and from which an observable amount varying cyclically is obtained, said control input based on said observable amount said control device comprising:

a deviation processing unit performing at least proportional integral control on a deviation between said observable amount and a command value being a target value of said observable amount and varying cyclically; and a totaling unit totaling an output of said deviation processing unit for each cycle of said command value to generate said control input, wherein said deviation processing unit includes a proportional computing unit outputting a result obtained by multiplying the deviation between said command value and said observable amount by a first gain, an integral computing unit outputting a value obtained by multiplying an integral of said deviation by a second gain, and a first adder adding and outputting at least an output of said proportional computing unit and an output of said integral computing unit, and said totaling unit includes a repetitive controller accumulating an output of said first adder for each cycle of said command value and outputting a result obtained by multiplying a result of the accumulation by a third gain, and a second adder adding an output of said first adder and an output of said repetitive controller to output said control input, wherein said second adder adds an output of said repetitive controller in a first phase of said cycle and an output of said first adder in a second phase of said cycle to output said control input, and said first phase and said second phase differ from each other.

2. The control device according to claim 1, wherein said integral computing unit operates after a lapse of a predetermined time from startup of said to-be-controlled system.

3. The control device according to claim 1, wherein said deviation processing unit further includes a differential computing unit differentiating said deviation and outputting a result obtained by multiplying a result of the differentiation by a fourth gain, and said first adder adds and outputs an output of said proportional computing unit, an output of said integral computing unit, and an output of said differential computing unit.

4. The control device according to claim 1, wherein said repetitive controller includes a delay unit outputting an input value with a delay by said cycle, a third adder obtaining a sum of an output of said first adder and an output of said delay unit and inputting said sum to delay unit, and a multiplier performing a multiplication by said third gain to obtain an output of said repetitive controller.

5. The control device according to claim 4, wherein after low-pass transmission is performed on an output of said delay unit, said third adder adds the output of said delay unit and an output of said first adder.

6. The control device according to claim 2, wherein
said deviation processing unit further includes a differential computing unit differentiating said deviation and outputting a result obtained by multiplying a result of the differentiation by a fourth gain, and
said first adder adds and outputs an output of said proportional computing unit, an output of said integral computing unit, and an output of said differential computing unit.

7. The control device according to claim 2, wherein said repetitive controller includes
a delay unit outputting an input value with a delay by said cycle,
a third adder obtaining a sum of an output of said first adder and an output of said delay unit and inputting said sum to delay unit, and
a multiplier performing a multiplication by said third gain to obtain an output of said repetitive controller.

8. The control device according to claim 3, wherein said repetitive controller includes
a delay unit outputting an input value with a delay by said cycle,
a third adder obtaining a sum of an output of said first adder and an output of said delay unit and inputting said sum to delay unit, and
a multiplier performing a multiplication by said third gain to obtain an output of said repetitive controller.

9. The control device according to claim 6, wherein said repetitive controller includes
a delay unit outputting an input value with a delay by said cycle,
a third adder obtaining a sum of an output of said first adder and an output of said delay unit and inputting said sum to delay unit, and
a multiplier performing a multiplication by said third gain to obtain an output of said repetitive controller.

10. The control device according to claim 7, wherein after low-pass transmission is performed on an output of said delay unit, said third adder adds the output of said delay unit and an output of said first adder.

11. The control device according to claim 8, wherein after low-pass transmission is performed on an output of said delay unit, said third adder adds the output of said delay unit and an output of said first adder.

12. The control device according to claim 9, wherein after low-pass transmission is performed on an output of said delay unit, said third adder adds the output of said delay unit and an output of said first adder.

* * * * *